United States Patent

[11] 3,629,035

[72] Inventor Minoru Kuroda
    Amagasaki, Japan
[21] Appl. No. 8,104
[22] Filed Jan. 20, 1970
[45] Patented Dec. 21, 1971
[73] Assignees Nishizawa Shoji Co., Ltd
    Osaka, Japan;
    Pilgrim Industries, Inc.
    New York, N.Y., part interest to each
[32] Priorities Dec. 19, 1966
[33] Japan
[31] 41/115532;
    Dec. 19, 1966, Japan, No. 41/115533; Dec. 19, 1966, Japan, No. 41/115535; Dec. 19, 1966, Japan, No. 41/83085
    Original application Aug. 24, 1971, Ser. No. 662,962, now abandoned. Divided and this application Jan. 20, 1970, Ser. No. 8,104

[54] METHOD OF FORMING APPLIQUE DESIGNS
    9 Claims, 5 Drawing Figs.
[52] U.S. Cl. .................................................. 156/219,
    156/228, 156/251, 156/268, 156/581, 161/40, 161/DIG. 3
[51] Int. Cl. ................................................. B31f 1/00,
    B32b 31/16
[50] Field of Search .......................................... 161/DIG. 3,
    40; 156/79, 219, 220, 228, 251, 247, 268, 581, 380, 212

[56] References Cited
UNITED STATES PATENTS

| | | | |
|---|---|---|---|
| 2,521,985 | 9/1950 | Lang et al. | 156/581 |
| 2,621,432 | 12/1952 | Willner | 161/DIG. 3 |
| 2,710,046 | 6/1955 | Markus et al. | 161/40 |
| 2,749,640 | 6/1956 | Scott | 161/28 X |
| 3,010,866 | 11/1961 | Douchet | 156/219 |
| 3,075,862 | 1/1963 | Hoyer | 156/219 X |
| 3,144,372 | 8/1964 | Peterson et al. | 156/251 |
| 3,219,506 | 11/1965 | Dusina, Jr. et al. | 161/DIG. 3 |
| 3,244,573 | 4/1966 | Raffaelli, Sr. | 156/515 X |
| 3,265,551 | 8/1966 | Ananian et al. | 156/219 |
| 3,520,754 | 7/1970 | Scholl et al. | 156/212 X |

FOREIGN PATENTS

| | | | |
|---|---|---|---|
| 937,755 | 9/1963 | Great Britain | 156/251 |
| 950,262 | 2/1964 | Great Britain | 156/219 |
| 1,018,841 | 2/1966 | Great Britain | 156/219 |
| 1,120,103 | 7/1968 | Great Britain | 156/251 |

Primary Examiner—Carl D. Quarforth
Assistant Examiner—Roger S. Gaither
Attorney—Michael S. Striker ABSTRACT: An applique design having its inner and outer contour lines secured to a substrate. The securing is made with a foaming plastic material which is used as an intermediate layer. This material also serves to present stereoscopic and perspective features of the applique design.

INVENTOR
MINORU KURODA

ATTORNEY

INVENTOR
MINORU KURODA
ATTORNEY

METHOD OF FORMING APPLIQUE DESIGNS

BACKGROUND OF THE INVENTION

This application is a division of parent application No. 662,962, filed Aug. 24, 1967, now abandoned.

This invention relates to a method of applying plastic designs to clothing, stationeries, bags, shoes and the like.

Designs printed on a sheet of plastic material, often called applique, are attached, for instance, to the desired personal belongings for ornamental purposes. Most of the methods now in practice for applying such appliques consist in pressing a heated mold platen against the applique sheet to make this latter adhere to a suitable substrate, and cutting the applique sheet by fusing it along the outlines of its printed design. This method is advantageous in that the printed design of the applique sheet is cut simultaneously as it sticks to the substrate. However, the portion of the applique design which is adhered to the substrate is extremely slender and linear substantially in correspondence with the sharp marginal edge of the mold which is a replica of the applique design. Such linear contact of the applique design is not adequate to hold it on the substrate, and such appliques are apt to peel off under relatively weak frictional forces. Furthermore, the applique sheet is adhered only at the outer contour lines of its print design to the substrate, and therefore, the applique design in its final form lacks a stereoscopic and perspective appearance which is desirable for this sort of ornamental article.

Whereas, it is primary object of this invention to provide new and useful method for the application of thermoplastic applique designs to clothing and other articles which permit the applique design to stick securely to a substrate and to present a stereoscopic and perspective appearance in its final form.

Other features of the invention will become apparent from the following description taken in connection with the accompanying drawings in which.

Figure 3:
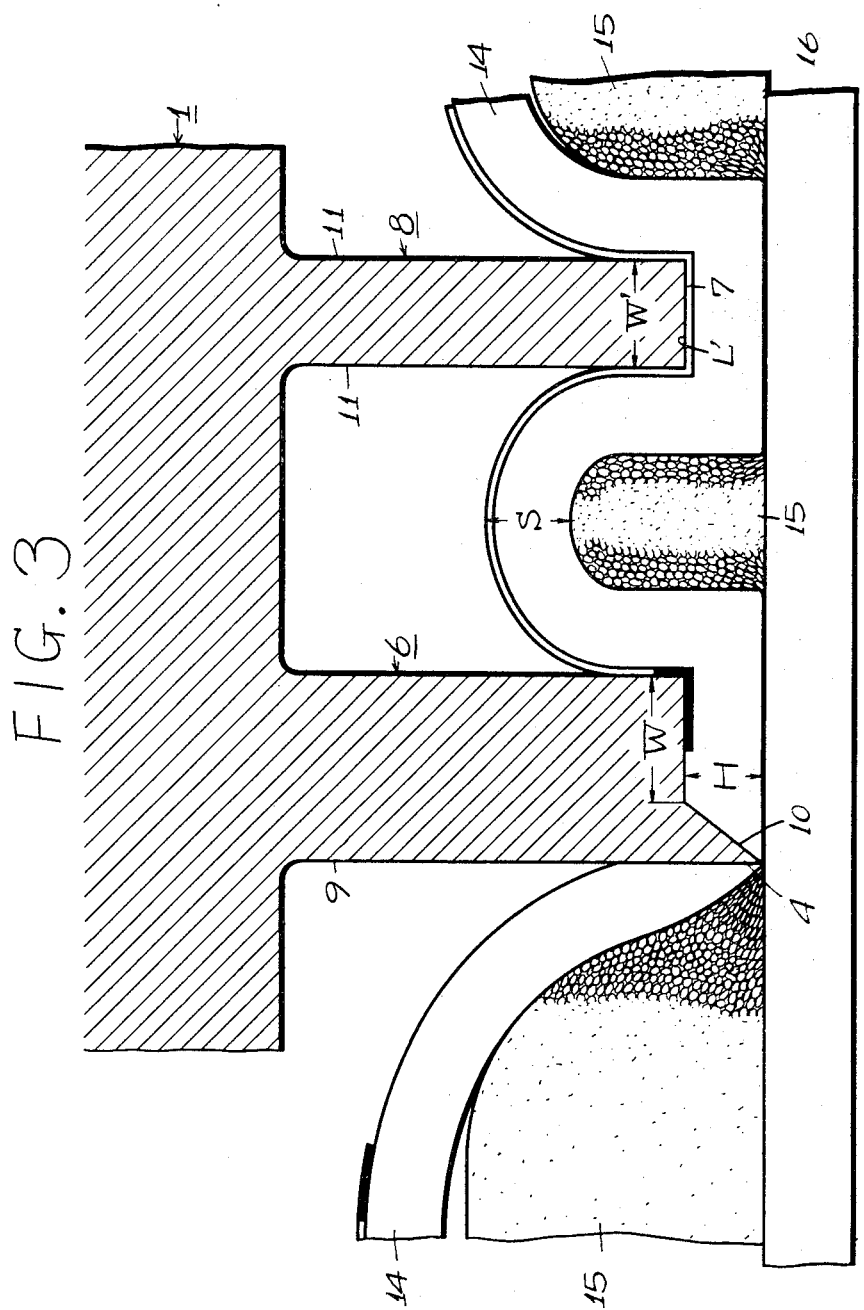
Figure 4:
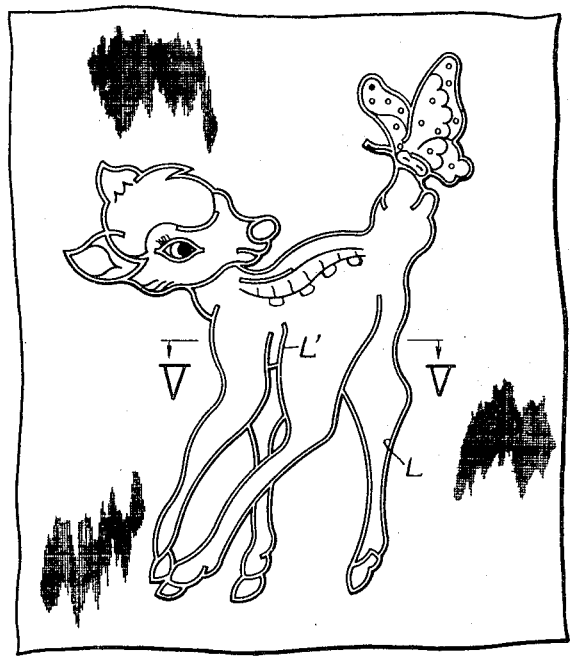
Figure 5:
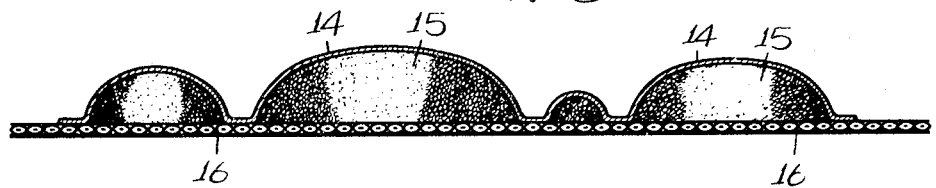

FIG. 3 schematically illustrates a part of the mold as being pressed against an applique sheet on enlarged scale;

FIG. 4 is a plan view of a sheet of cloth to which the applique design is applied in accordance with the invention, and FIG. 5 is a magnified sectional view taken on line V—V of FIG. 4.

Briefly stated, the inventive concept of the present invention resides in placing a sheet of a thermoplastic foam upon a suitable substrate, superimposing upon said thermoplastic foam an applique sheet of thermoplastic material having a printed design surface, and bringing said applique sheet into pressure contact with a heated mold carrying a pattern configured in conformance with the inner and outer bonding zones of the printed design of the applique sheet, said pattern having an edged projection corresponding to the outer contour line of the design and a blunt projection corresponding to the inner bonding zone of the design.

An apparatus for carrying the method into effect essentially comprises a mold platen 1 and a heating platen 2 connected thereto by, for instance, bolts 14.

Figure 1:
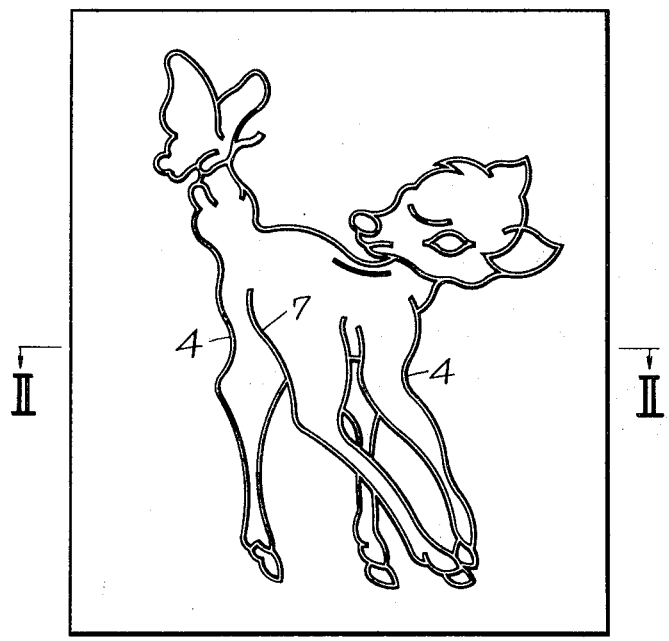
FIG. 1 is a plan view of a mold platen having a bladed pattern representing a fawn for illustration purposes.
Figure 2:
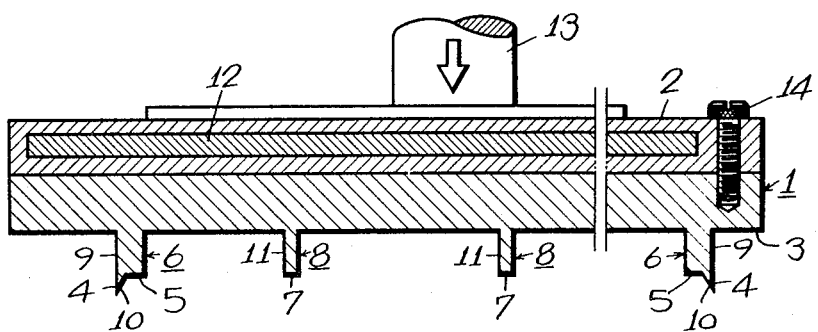
FIG. 2 is a sectional view taken on the line II—II of FIG. 1.

The mold platen 1, as cross-sectionally shown in FIG. 2, is provided at its undersurface 3 with a bladed projection 6 having a sharp edge 4 and a flat face 5 and with a blunt projection 8 having a flat head 7. The sharp edge 4 of the bladed projection 6 has a vertical sidewall 9 adjoining to the unprinted area of the applique design and an inclined sidewall 10 adjoining to the applique design. The flat face 5 extends substantially horizontally from the upper end of the inclined sidewall 10.

The distance H between the lowermost point of the sharp edge 4 and the flat face 5 should preferably be smaller than the thickness S of the applique sheet. The width W of the flat face 5 may advantageously be wide enough to cover at least a portion of the outer bonding zone of the applique design.

The blunt projection 8 has a horizontal flat head 7 and vertical sidewalls 11 and coincides with an inner bonding zone L', while the flat head 7 is flush with the flat face 5. The width W' of the flat head 7 may advantageously be wide enough to cover at least a portion of the inner bonding zone L'.

Referring to FIG. 2, a heater 12 such as, for example, a high frequency heating device, may be mounted in the heating platen 2. There is provided a lifting rod 13 for moving the mold in the direction of the arrow.

The applique sheet 14 may be of a thermoplastic resin, for example polyvinyl chloride. The foamed plastic sheet 15 may be of a material similar to that of the applique sheet 14 or other suitable thermoplastic material. The applique sheet 14 is placed on the foamed plastic sheet 15 and superimposed upon a base sheet 16 of a suitable material. These sheets are then compressed by the heated mold platen 1 with the bladed projection 6 and blunt projections 8 held in registry with the outer bonding zone L and inner L', respectively.

The mold moves downwardly until the sharp edge 4 reaches the base sheet 16, whereby the applique sheet 14 and the foamed plastic sheet 15 are fused and cut along the outline L. It will be appreciated that the foam layer 15 is useful for its plasticity to act as an adhesive to bond the applique sheet to the base sheet along the bonding zone of the printed design, and for its elasticity to permit the land of the design to remain uncompressed.

Referring now to FIG. 3 and 5, the sharp edge 4 of the bladed projection 6 is held in contact with the base sheet 16 thereby separating the outer blank portion of the applique sheet 14 from the design portion.

The sharp edge 4 severs the applique sheet along the outline or outer contour line of the design and provides a clear-cut outer contour line. While the applique sheet is still in a plastic state, the outer blank portion may be easily removed from the design portion.

The printed areas of the applique design hemmed in by the outer and inner bonding zones are caused to swell by the action of the foam layer 15 to create the stereoscopic and perspective features.

The applique design thus finished is firmly fixed to the base sheet along its outer and inner bonding zones and it is thereby highly resistant to friction and tension.

It will be apparent to those skilled in the art that various changes may be made in the invention without departing from the spirit and scope thereof. For example, the bladed portion 6 may have an inwardly curved sidewall instead of the inclined sidewall 10. The blunt portion 8 may have inclined or curved sidewalls instead of the vertical sidewalls 11.

I claim:

1. A method of applying an applique to a support, comprising the steps of providing a cover layer of synthetic plastic sheet material having a design surface with an outer contour line, a narrow outer bonding zone along said outer contour line and at least one inner bonding zone spaced inwardly from said outer bonding zone; further providing an intermediate layer of a resiliently compressible latently adhesive thermoplastic material having spaces filled with a gaseous medium; sandwiching said intermediate layer between said cover layer and a support material; and pressing against said cover layer die means having outer and inner pressure faces corresponding to said outer and inner bonding zones and a raised cutting edge fixed along said outer pressure face and corresponding to said contour line, while activating said latently adhesive thermoplastic material of said intermediate layer and thereby bonding said cover layer by said intermediate layer in said outer and inner bonding zones to said support material while severing said cover layer and intermediate layer along said outer contour line, the presence of said intermediate layer resulting in formation of a cushion between said support material and said cover layer in the area surrounded by said outer bonding zone upon bonding of said cover layer to said support material.

2. A method as defined in claim 1 wherein said synthetic plastic sheet material of said cover layer is a thermoplastic material.

3. A method as defined in claim 1 wherein the step of activating said latently adhesive thermoplastic material of said intermediate layer comprises subjecting said layers to the influence of elevated temperature in said inner and outer bonding zones.

4. A method as defined in claim 1 wherein the step of activating said latently adhesive thermoplastic material of said intermediate layer comprises heating at least said pressure faces of said die means while pressing the latter against said cover layer.

5. A method as defined in claim 1 wherein said resiliently compressible thermoplastic material of said intermediate layer is a cellular material.

6. A method as defined in claim 1, wherein the step of pressing said die means against said cover sheet comprises compressing said intermediate layer substantially only in said inner and outer bonding zones, while leaving the remainder of said intermediate layer uncompressed.

7. A method as defined in claim 1, wherein said narrow outer bonding zone is inwardly contiguous to said outer contour line.

8. A method as defined in claim 1, wherein said narrow outer contour line surrounds said design surface.

9. A method as defined in claim 1, wherein said resiliently compressible thermoplastic material of said intermediate layer has a cellular structure; and wherein the step of bounding said cover layer by said thermoplastic material of said intermediate layer to said support material includes collapsing of the cellular structure of said thermoplastic material of said intermediate layer in said inner and outer bonding zones.

* * * * *

UNITED STATES PATENT OFFICE
CERTIFICATE OF CORRECTION

PATENT NO. : 3,629,035
DATED : Dec. 21, 1971
INVENTOR(S) : Minoru Kuroda

It is certified that error appears in the above-identified patent and that said Letters Patent are hereby corrected as shown below:

In the heading, [31], line 5 should read

-- Original application Aug. 24, 1967, Ser. --.

Signed and Sealed this twenty-first Day of October 1975

[SEAL]

Attest:

RUTH C. MASON
*Attesting Officer*

C. MARSHALL DANN
*Commissioner of Patents and Trademarks*